United States Patent
Na et al.

(10) Patent No.: US 9,979,426 B2
(45) Date of Patent: May 22, 2018

(54) WATCH-TYPE MOBILE TERMINAL INCLUDING ANTENNA

(71) Applicant: LG ELECTRONICS INC., Seoul (KR)

(72) Inventors: Youngsoo Na, Seoul (KR); Jaewook Yu, Seoul (KR); Namsoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

(21) Appl. No.: 15/412,871

(22) Filed: Jan. 23, 2017

(65) Prior Publication Data

US 2017/0214422 A1    Jul. 27, 2017

(30) Foreign Application Priority Data

Jan. 27, 2016 (KR) ........................ 10-2016-0010185

(51) Int. Cl.
*H04B 1/3827*   (2015.01)
*H04W 4/00*   (2018.01)
*H04W 84/12*   (2009.01)
*H04W 88/06*   (2009.01)

(52) U.S. Cl.
CPC ............ *H04B 1/385* (2013.01); *H04W 4/008* (2013.01); *H04B 2001/3861* (2013.01); *H04W 84/12* (2013.01); *H04W 88/06* (2013.01)

(58) Field of Classification Search
CPC ................................. H04B 5/00; H01Q 1/243
See application file for complete search history.

(56) References Cited

U.S. PATENT DOCUMENTS

| | | | | |
|---|---|---|---|---|
| 6,281,854 B1 * | 8/2001 | Ohoka | .................... | H01Q 1/273 343/718 |
| 6,476,775 B1 * | 11/2002 | Oberle | ............. | G06K 19/07749 29/600 |
| 6,856,286 B2 * | 2/2005 | Jo | .......................... | H01Q 1/243 343/700 MS |
| 6,909,402 B2 * | 6/2005 | Vance | .................... | H01Q 1/243 343/700 MS |
| 7,379,712 B2 * | 5/2008 | Saarnimo | ............... | H04B 1/385 343/741 |
| 7,570,225 B2 * | 8/2009 | Kai | .................. | G06K 19/07749 343/741 |
| 7,616,164 B2 * | 11/2009 | Krier | ........................ | H01Q 1/24 343/700 MS |

(Continued)

*Primary Examiner* — Cindy Trandai
(74) *Attorney, Agent, or Firm* — Lee Hong Degerman Kang & Waimey

(57) ABSTRACT

A watch-type mobile terminal including an antenna is provided. The watch-type mobile terminal may include a body configuring an external appearance of a watch and operating as a loop antenna, a plurality of feeding units applying each of a plurality of communication signals to the loop antenna, and a ground part connected to a ground of the watch. In this case, the body may include a metal housing connected to the ground part and corresponding to an outer loop, a metal bezel connected to the plurality of feeding units and corresponding to the inner loop, and a slot member disposed between the metal housing and the metal bezel to electrically disconnect the metal housing from the metal bezel. An antenna for providing a plurality of communication services may be provided.

18 Claims, 12 Drawing Sheets

(56) References Cited

U.S. PATENT DOCUMENTS

| | | | | |
|---|---|---|---|---|
| 8,537,070 B2* | 9/2013 | Kai | | G06K 19/0779 |
| | | | | 343/770 |
| 8,646,695 B2* | 2/2014 | Worrall | | G06K 19/07762 |
| | | | | 235/488 |
| 9,178,278 B2* | 11/2015 | Zhu | | H01Q 7/00 |
| 9,390,367 B2* | 7/2016 | MacHado | | G06K 19/07786 |
| 9,571,612 B2* | 2/2017 | Jochheim | | H04B 1/385 |
| 9,614,282 B1* | 4/2017 | Zheng | | H01Q 7/005 |
| 2008/0122683 A1* | 5/2008 | Howley | | G01S 3/04 |
| | | | | 342/149 |
| 2009/0121944 A1* | 5/2009 | Sotoudeh | | H01Q 1/243 |
| | | | | 343/702 |
| 2009/0134226 A1* | 5/2009 | Stobbe | | G06K 7/0008 |
| | | | | 235/462.44 |
| 2013/0237289 A1* | 9/2013 | Mittleman | | H04M 1/0202 |
| | | | | 455/567 |
| 2014/0132463 A1* | 5/2014 | Hobson | | H01Q 1/243 |
| | | | | 343/702 |
| 2014/0139486 A1* | 5/2014 | Mistry | | G06F 3/0304 |
| | | | | 345/175 |
| 2014/0233168 A1* | 8/2014 | Hobson | | H01Q 1/243 |
| | | | | 361/679.3 |
| 2014/0354494 A1* | 12/2014 | Katz | | H01Q 1/273 |
| | | | | 343/718 |
| 2015/0200448 A1* | 7/2015 | Tsai | | H01Q 1/243 |
| | | | | 343/702 |
| 2015/0201459 A1* | 7/2015 | Sato | | H01Q 7/00 |
| | | | | 455/552.1 |
| 2016/0028157 A1* | 1/2016 | Kim | | H01Q 5/335 |
| | | | | 343/852 |
| 2016/0056533 A1* | 2/2016 | Nissinen | | H01Q 9/0421 |
| | | | | 343/702 |
| 2016/0142083 A1* | 5/2016 | Kim | | H04B 1/1009 |
| | | | | 455/300 |
| 2016/0226132 A1* | 8/2016 | Kim | | H01Q 1/243 |
| 2016/0315373 A1* | 10/2016 | Azad | | H01Q 1/243 |
| 2016/0357160 A1* | 12/2016 | Fujisawa | | G04R 20/02 |
| 2017/0018838 A1* | 1/2017 | Wu | | H01Q 1/48 |
| 2017/0033441 A1* | 2/2017 | Son | | H01Q 1/243 |
| 2017/0033812 A1* | 2/2017 | Son | | H04B 1/0483 |
| 2017/0047637 A1* | 2/2017 | Kim | | H01Q 1/243 |
| 2017/0048363 A1* | 2/2017 | Lee | | H01Q 1/243 |
| 2017/0207518 A1* | 7/2017 | Lee | | H01Q 1/243 |
| 2017/0244153 A1* | 8/2017 | Chen | | H01Q 1/243 |

* cited by examiner (a)

(b)

(c)

(d)

(a)

(b)

(a)

(b)

(c)

(a)

(b)

(a)

(b)

WATCH-TYPE MOBILE TERMINAL INCLUDING ANTENNA

CROSS-REFERENCE TO RELATED APPLICATION

Pursuant to 35 U.S.C. § 119(a), this application claims the benefit of earlier filing date and right of priority to Korean Application No. 10-2016-0010185, filed on Jan. 27, 2016, the contents of which are all hereby incorporated by reference herein in its entirety.

BACKGROUND OF THE DISCLOSURE

1. Field of the Disclosure

The present disclosure relates to a watch-type mobile terminal including an antenna, and particularly, to a multi-band antenna accommodated into a body of a watch-type mobile terminal.

2. Background of the Disclosure

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions may include data and voice communications, capturing images and video through a camera, recording audio, playing music files through a speaker system, and displaying images and video on a display unit. Some mobile terminals additionally provide functions such as playing an electronic game, or executing a function of multimedia players. Especially, recent mobile terminals may receive multicast signal for providing visual content such as broadcasts, videos, or television programs.

As it becomes multifunctional, a mobile terminal can be allowed to capture still images or moving images, play music or video files, play games, receive broadcast and the like, so as to be implemented as an integrated multimedia player.

Recently, mobile terminals may be provided as watch-type mobile terminals wearable on human bodies. In the watch-type mobile terminals, since a number of electronic elements should be mounted in a narrow mounting space, there is a limitation in space. Even in the watch-type mobile terminals, needs for a plurality of communication services are increasing. To this end, a plurality of antennas for providing the plurality of communication services cannot all be mounted on each of the watch-type mobile terminals.

SUMMARY OF THE DISCLOSURE

Therefore, an aspect of the detailed description is to provide a watch-type mobile terminal for solving the above-described problems and the other problems.

Another aspect of the detailed description is to provide one antenna for providing a plurality of communication services.

To achieve these and other advantages and in accordance with the purpose of this specification, as embodied and broadly described herein, a watch-type mobile terminal includes: a body configuring an external appearance of a watch and operating as a loop antenna; a plurality of feeding units applying each of a plurality of communication signals to the loop antenna; and a ground part connected to a ground of the watch. In this case, the body includes: a metal housing connected to the ground part, the metal housing corresponding to an outer loop; a metal bezel connected to the plurality of feeding units, the metal bezel corresponding to the inner loop; and a slot member disposed between the metal housing and the metal bezel to electrically disconnect the metal housing from the metal bezel.

According to an embodiment, the plurality of feeding units may include: a first feeding unit applying a communication signal at a first frequency band and a second frequency band for a mobile communication service; a second feeding unit applying a communication signal at a third frequency band and a fourth frequency band for a Wi-Fi or Bluetooth communication service; and a third feeding unit applying a radio frequency (RF) signal at a fifth frequency band for a global positioning system (GPS) service.

According to an embodiment, the first feeding unit and the second feeding unit may be connected to the inner loop and the outer loop, and the third feeding unit may be slot-fed to a space between the inner loop and the outer loop.

According to an embodiment, one end of each of the inner loop and the outer loop may be close to another end of each of inner loop and the outer loop so that a radio frequency (RF) signal at the one end is coupled to the other end, and the other end of each of inner loop and the outer loop may be open.

According to an embodiment, the second frequency band may be a frequency band which is higher than the first frequency band, and a length of a circumference of the loop antenna may be set to a half wave length at the first frequency band and may be set to one wave length at the second frequency band.

According to an embodiment, the fourth frequency band may be a frequency band which is higher than the third frequency band, and a length from the second feeding unit to the ground part may be set to a half wave length at the third frequency band and may be set to one wave length at the fourth frequency band.

According to an embodiment, the third feeding unit may correspond to a ¼ point of a length of a circumference of the loop antenna from the one end.

According to an embodiment, the first to third feeding units may be vertically coupled to the loop antenna.

In another aspect of the present invention, an antenna includes: an inner loop having an open type; an outer loop spaced apart from the inner loop by a certain separation distance; a connector connected to one end of each of the inner loop and the outer loop; a plurality of feeding units applying each of a plurality of communication signals at one point of each of the inner loop and the outer loop; and a ground part connected to a ground of a watch in one of the inner loop and the outer loop. In this case, the inner loop and the outer loop are accommodated into a body configuring an external appearance of a watch-type mobile terminal.

According to an embodiment, the plurality of feeding units may include: a first feeding unit applying a communication signal at a first frequency band and a second frequency band for a mobile communication service; a second feeding unit applying a communication signal at a third frequency band and a fourth frequency band for a Wi-Fi or Bluetooth communication service; and a third feeding unit applying a radio frequency (RF) signal at a fifth frequency band for a global positioning system (GPS) service.

According to an embodiment, the third feeding unit may be slot-fed to a space between the inner loop and the outer loop.

According to an embodiment, another end of each of inner loop and the outer loop may be open, and the one end of each of the inner loop and the outer loop may be close to the other end of each of inner loop and the outer loop so that a radio frequency (RF) signal at the one end is coupled to the other end.

According to an embodiment, the second frequency band may be a frequency band which is higher than the first frequency band, and a length of a circumference of the loop antenna may be set to a half wave length at the first frequency band and may be set to one wave length at the second frequency band.

According to an embodiment, the fourth frequency band may be a frequency band which is higher than the third frequency band, and a length from the second feeding unit to the ground part may be set to a half wave length at the third frequency band and may be set to one wave length at the fourth frequency band.

According to an embodiment, the third feeding unit may correspond to a ¼ point of a length of a circumference of the loop antenna from the one end.

According to an embodiment, the metal housing and the metal bezel may be connected to each other at one end thereof.

According to an embodiment, the plurality of feeding units may each include a pin into which a spring is inserted. Also, the pin may be accommodated into a groove of the metal bezel, and when the metal bezel rotates, the metal bezel and the pin may be electrically connected to each other.

According to an embodiment, the plurality of feeding units may each include an arch type spring, and when the spring contacts a contact guide of the metal bezel and the metal bezel rotates, the metal bezel and the pin may be electrically connected to each other.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Figure 1A:
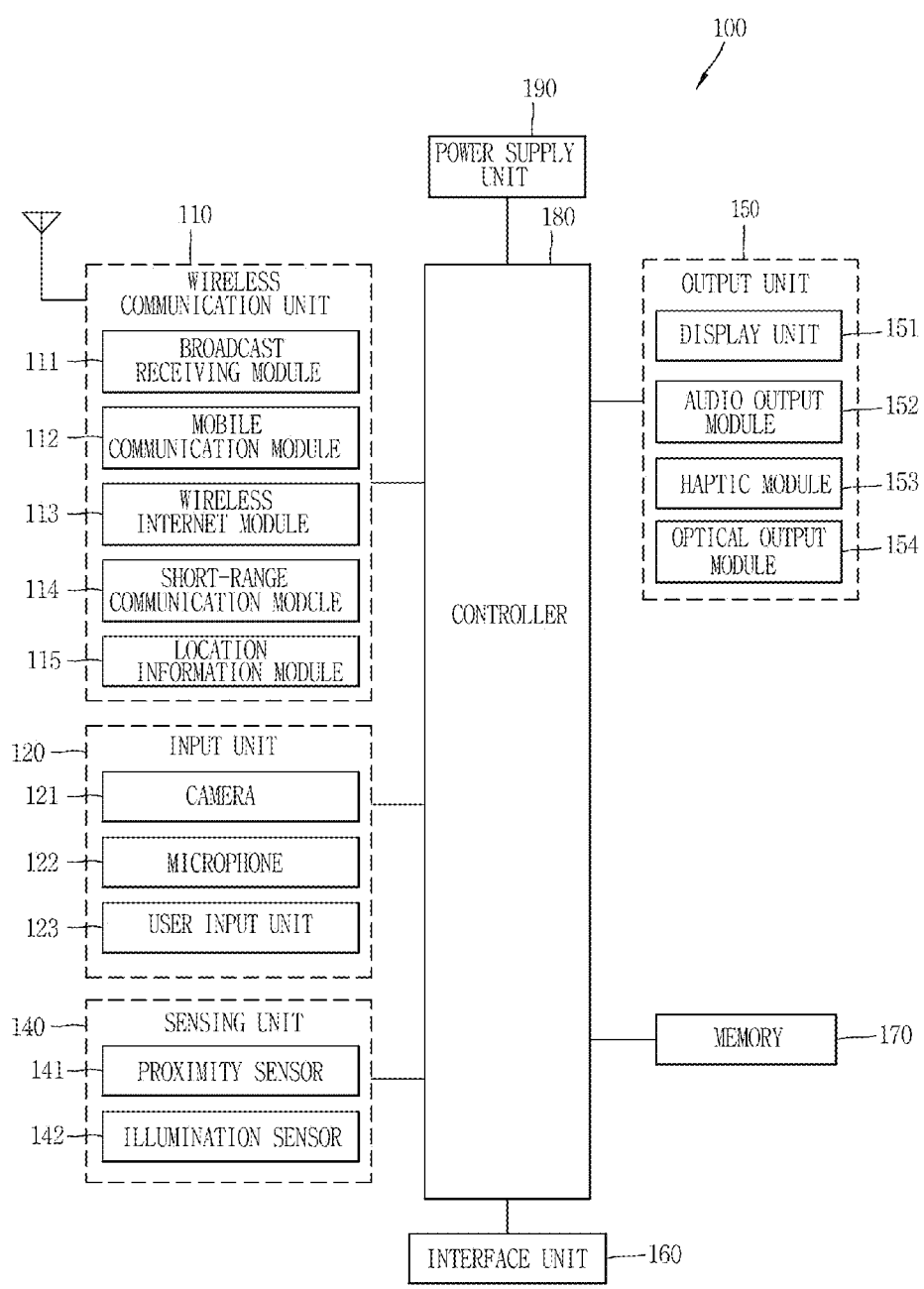
FIG. 1A is a block diagram for describing a mobile terminal according to an embodiment of the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart glasses), head mounted displays (HMDs), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and a digital signage.

Figure 1B:
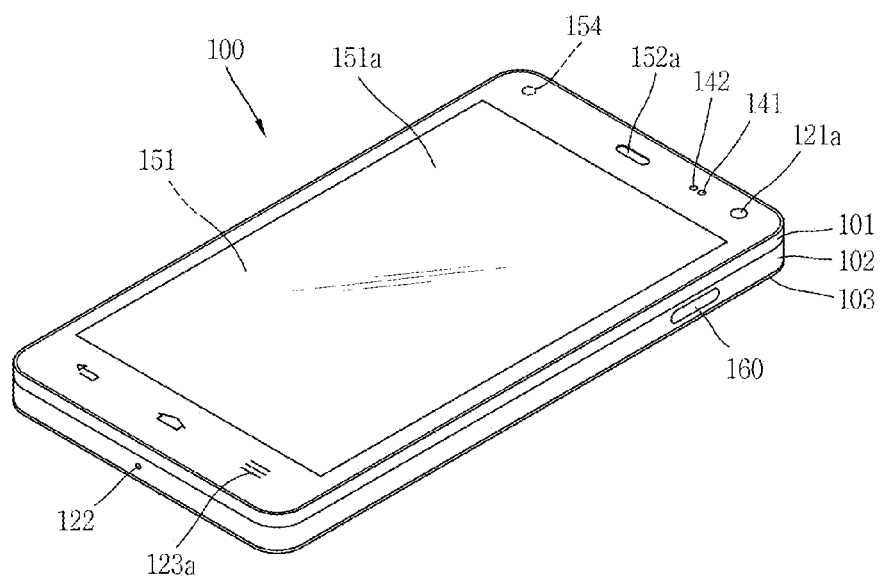
FIGS. 1B and 1C are conceptual views when an example of a mobile terminal according to an embodiment of the present invention is seen in different directions.
Figure 1C:
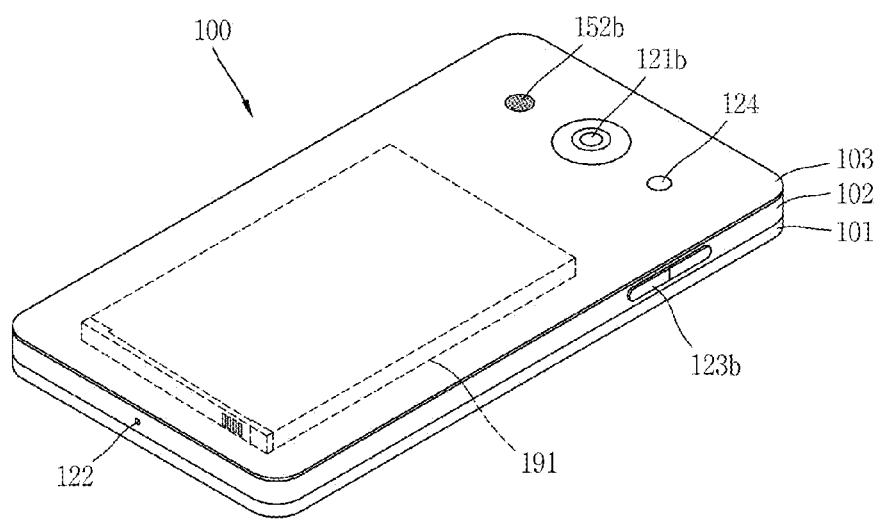

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components of FIG. 1A is not a requirement, and that greater or fewer components may alternatively be implemented.

Referring now to FIG. 1A, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

A third camera 121c may be further provided on a front surface of the terminal body. In this case, the third camera 121c may be disposed near the first camera 121a, or near the opposite side to the first camera 121a (i.e., the optical output unit 154).

The third camera 121c may be provided with a wide angle lens. In this case, the third camera 121c may support a wider viewing angle than the first camera 121a. In a general angle mode, the first camera 121a may be activated for capturing. And in a wide angle mode, the third camera 121c may be activated for capturing. An image captured by the third camera 121c may include a larger number of subjects than an image captured by the first camera 121a. However, in this case, distortion occurs toward a peripheral part of a frame.

The third camera 121c may be activated together with or independently from the first camera 121a when the first camera 121a is activated. If the third camera 121c is activated together when the second camera 121b formed on a rear surface of the terminal body is activated, an image captured by the third camera 121c may be used to compensate for a white balance reference value of an image captured by the first camera 121a.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

As previously described with regard to FIG. 1A, the mobile terminal may be configured to include short-range communication techniques such as Bluetooth™, Radio Frequency Identification (RFID), Infrared Data Association (IrDA), Ultra Wideband (UWB), ZigBee, Near Field Communication (NFC), Wireless USB (Wireless Universal Serial Bus), and the like.

Figure 2:
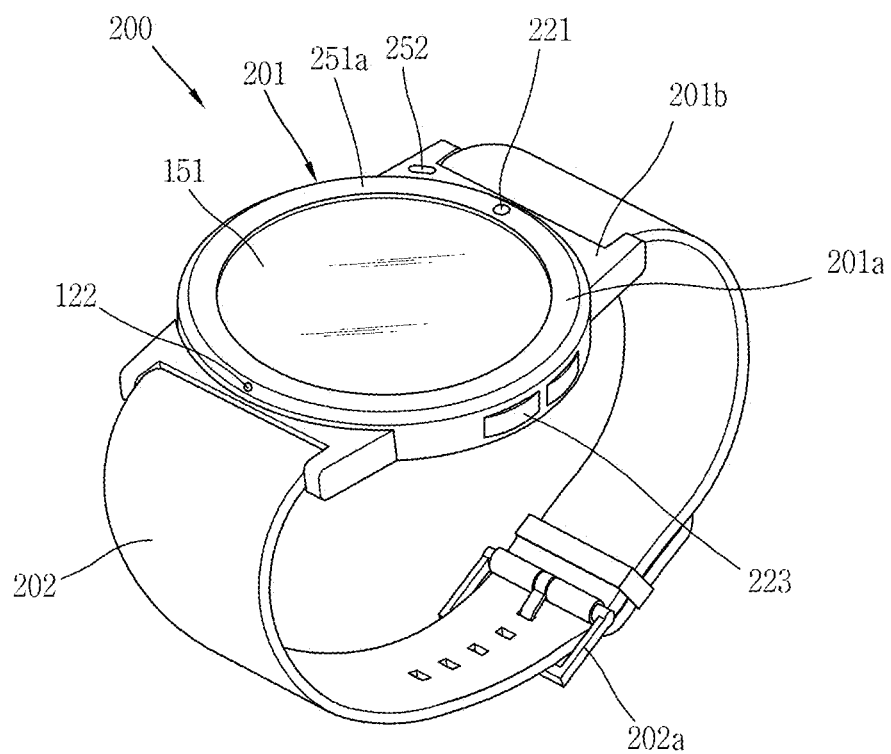
FIG. 2 is a perspective view illustrating an example of a watch-type mobile terminal according to another embodiment of the present invention.

FIG. 2 is a perspective view illustrating one example of a watch-type mobile terminal 200 in accordance with another exemplary embodiment.

As illustrated in FIG. 2, the watch-type mobile terminal 200 includes a main body 201 with a display unit 251 and a band 202 connected to the main body 201 to be wearable on a wrist. In general, mobile terminal 200 may be configured to include features that are the same or similar to that of mobile terminal 100 of FIGS. 1A-1C.

The main body 201 may include a case having a certain appearance. As illustrated, the case may include a first case 201a and a second case 201b cooperatively defining an inner space for accommodating various electronic components. Other configurations are possible. For instance, a single case may alternatively be implemented, with such a case being configured to define the inner space, thereby implementing a mobile terminal 200 with a uni-body.

The watch-type mobile terminal 200 can perform wireless communication, and an antenna for the wireless communication can be installed in the main body 201. The antenna may extend its function using the case. For example, a case including a conductive material may be electrically connected to the antenna to extend a ground area or a radiation area.

The display unit 251 is shown located at the front side of the main body 201 so that displayed information is viewable to a user. In some embodiments, the display unit 251 includes a touch sensor so that the display unit can function as a touch screen. As illustrated, window 251a is positioned on the first case 201a to form a front surface of the terminal body together with the first case 201a.

The illustrated embodiment includes audio output module 252, a camera 221, a microphone 222, and a user input unit 223 positioned on the main body 201. When the display unit 251 is implemented as a touch screen, additional function keys may be minimized or eliminated. For example, when the touch screen is implemented, the user input unit 223 may be omitted.

The band 202 is commonly worn on the user's wrist and may be made of a flexible material for facilitating wearing of the device. As one example, the band 202 may be made of fur, rubber, silicon, synthetic resin, or the like. The band 202 may also be configured to be detachable from the main body 201. Accordingly, the band 202 may be replaceable with various types of bands according to a user's preference.

In one configuration, the band 202 may be used for extending the performance of the antenna. For example, the band may include therein a ground extending portion (not shown) electrically connected to the antenna to extend a ground area.

The band 202 may include fastener 202a. The fastener 202a may be implemented into a buckle type, a snap-fit hook structure, a Velcro® type, or the like, and include a flexible section or material. The drawing illustrates an example that the fastener 202a is implemented using a buckle.

As described above with reference to FIGS. 1A to 1C and 2, according to an embodiment of the present invention, the body 201 may be implemented with a metal material for preventing an external appearance from being damaged in use and improving a design. In this case, an antenna that transmits an electromagnetic wave to a free space through a wireless communication unit 110 or receives the electromagnetic wave through the free space is inevitably affected by the body 201. Also, due to an internal narrow mounting space of the watch-type mobile terminal 200, the watch-type mobile terminal 200 cannot include all of a plurality of antennas for providing a plurality of communication services.

In order to solve such problems, the watch-type mobile terminal 200 including a body and an antenna accommodated into the body according to an embodiment of the present invention will be described below in detail with reference to FIGS. 3 to 9.

Figure 3:
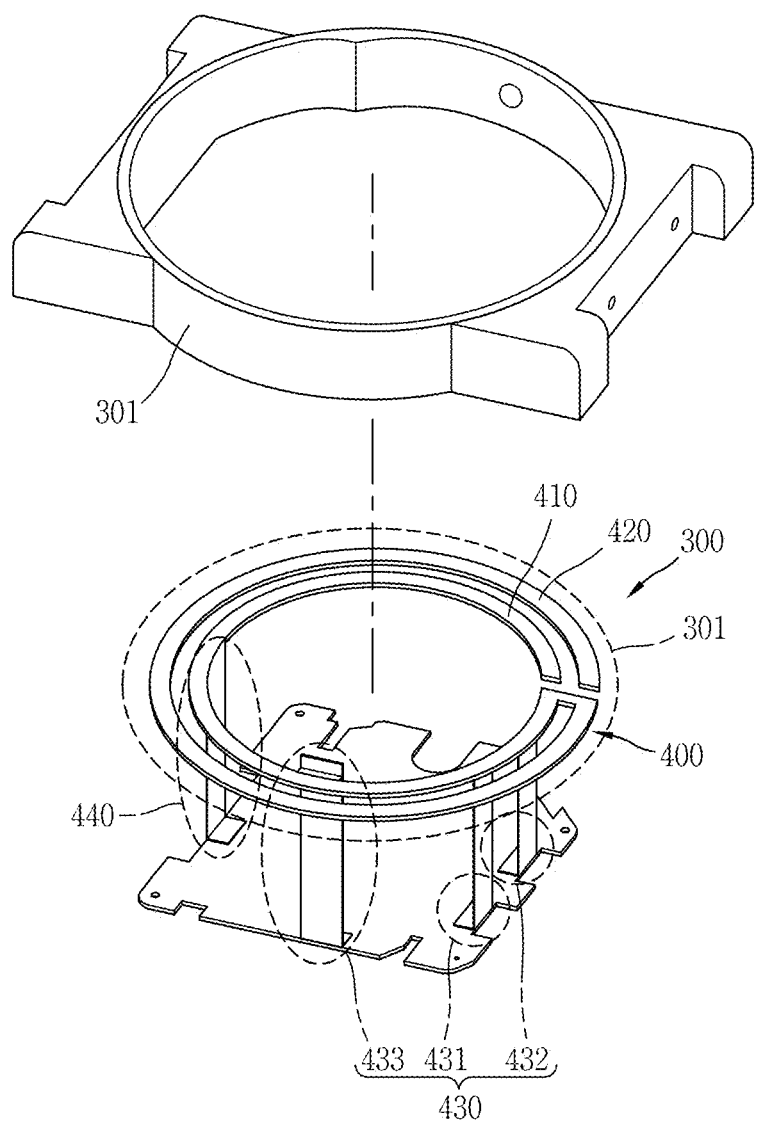
FIG. 3 is an exploded view of a watch illustrating a body of a watch according to an embodiment of the present invention and an antenna and a printed circuit board (PCB) accommodated into the body.

FIG. 3 is an exploded view of a watch illustrating a body of a watch according to an embodiment of the present invention and an antenna and a PCB accommodated into the body.

Figure 4:
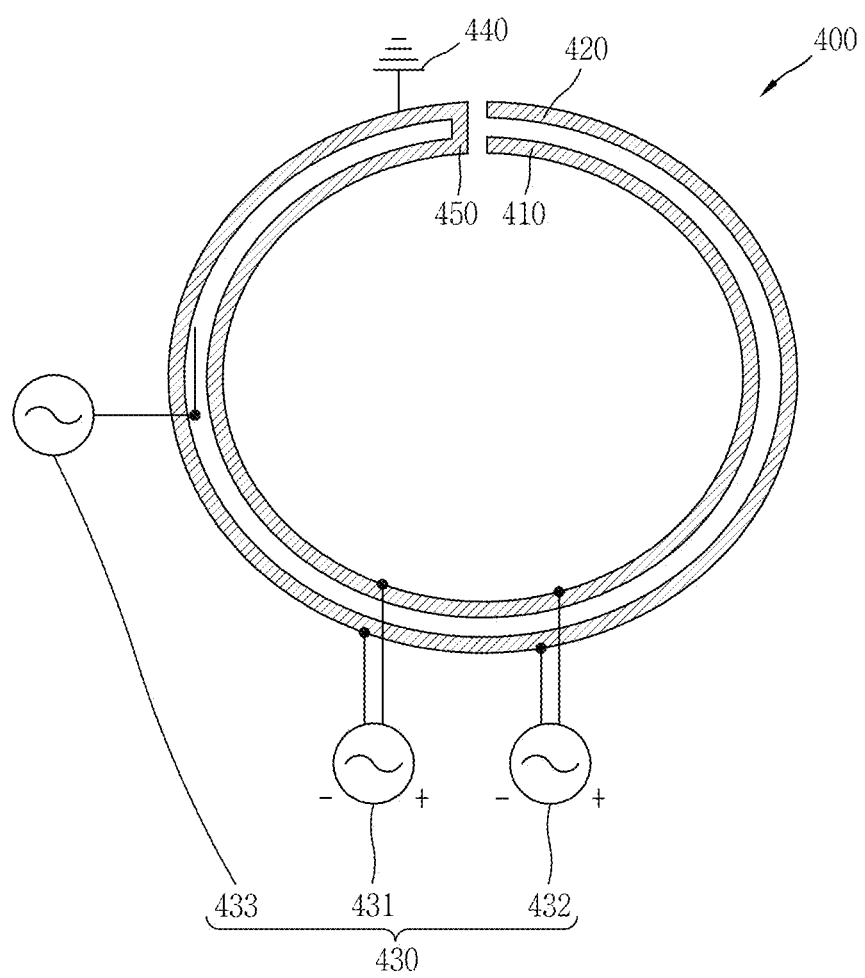
FIG. 4 illustrates a loop antenna including a plurality of feeding units and one ground part, according to an embodiment of the present.

FIG. 4 illustrates a loop antenna including a plurality of feeding units and one ground part, according to an embodiment of the present.

Referring to FIGS. 3 and 4, a watch-type mobile terminal 300 may include a body 301 and a loop antenna 400.

The body 301 may configure an external appearance of the watch. Here, a supporting part (or deco) for supporting a display unit of the watch may be equipped in the body 301. Therefore, a slot may be provided in the supporting part (or deco), and thus, the loop antenna 400 including an inner loop and an outer loop may be provided.

The loop antenna 400 may include an inner loop 410, an outer loop 420, a plurality of feeding units 430, and a ground part 440. Also, the loop antenna 400 may further include a connector 450.

That is, the loop antenna 400 may include the inner loop 410 having an open type and the outer loop 420 having an open type. The loop antenna 400 may be accommodated into the body 301.

In this case, the outer loop 420 may be spaced apart from the inner loop 410 by a certain separation distance.

In this case, the loop antenna 400 may be connected to one end of each of the inner loop 410 and the outer loop 420. Here, a switching element may be provided in the one end, and thus, the one end may be electrically turned on or off.

Moreover, the loop antenna 400 may include the plurality of feeding units 430 for respectively applying a plurality of communication signals and the ground part 440 connected to a ground of the watch.

The inner loop 410 may include a metal material and may have a circular shape and an open type. Also, the outer loop 420 may include a metal material and may have a circular shape and an open type. The outer loop 420 may be spaced apart from the inner loop 410 by a certain separation distance.

The plurality of feeding units 430 may respectively apply the plurality of communication signals at one point of each of the inner loop 410 and the outer loop 420.

The ground part 440 may be connected to the ground of the watch in one of the inner loop 410 and the outer loop 420. The ground part 440 may include a switching element so that one of the inner loop 410 and the outer loop 420 is electrically connected to or disconnected from the ground. Resonance lengths which physically differ at different frequency bands may be provided at a first frequency band and a second frequency band by the switching element.

The connector 450 may connect the inner loop 410 and the outer loop 420 at one end of each of the inner loop 410 having an open type and the outer loop 420 which is spaced apart from the inner loop 410 by the certain separation distance. Here, the connector 450 may include a switching element, and thus, the one end may be electrically turned on or off.

As illustrated in FIGS. 3 and 4, the other end of the inner loop 410 and the other end of the outer loop 420 may be open. In this case, a radio frequency (RF) signal at the one end of the connector 450 may be coupled to the other end, and then one end may get closer to the other end. Also, according to another embodiment of the present invention, the one end and the other end of each of the inner loop 410 and the outer loop 420 may be electrically turned on or off by the switching element. Due to the turn-on or off, a resonance length of the inner loop 410 and a resonance length of the outer loop 420 may be differently provided at different frequency bands.

The plurality of feeding units 430 will be described below in detail. The plurality of feeding units 430 may include a first feeding unit 431, a second feeding unit 432, and a third feeding unit 433. The first feeding unit 431 may apply a communication signal at the first frequency band and the second frequency band for a mobile communication service. The second feeding unit 432 may apply a communication signal at the third frequency band and the fourth frequency band for a Wi-Fi or Bluetooth communication service. Also, the third feeding unit 433 may apply an RF signal at the fifth frequency band for a global positioning system (GPS) service.

Figure 5:
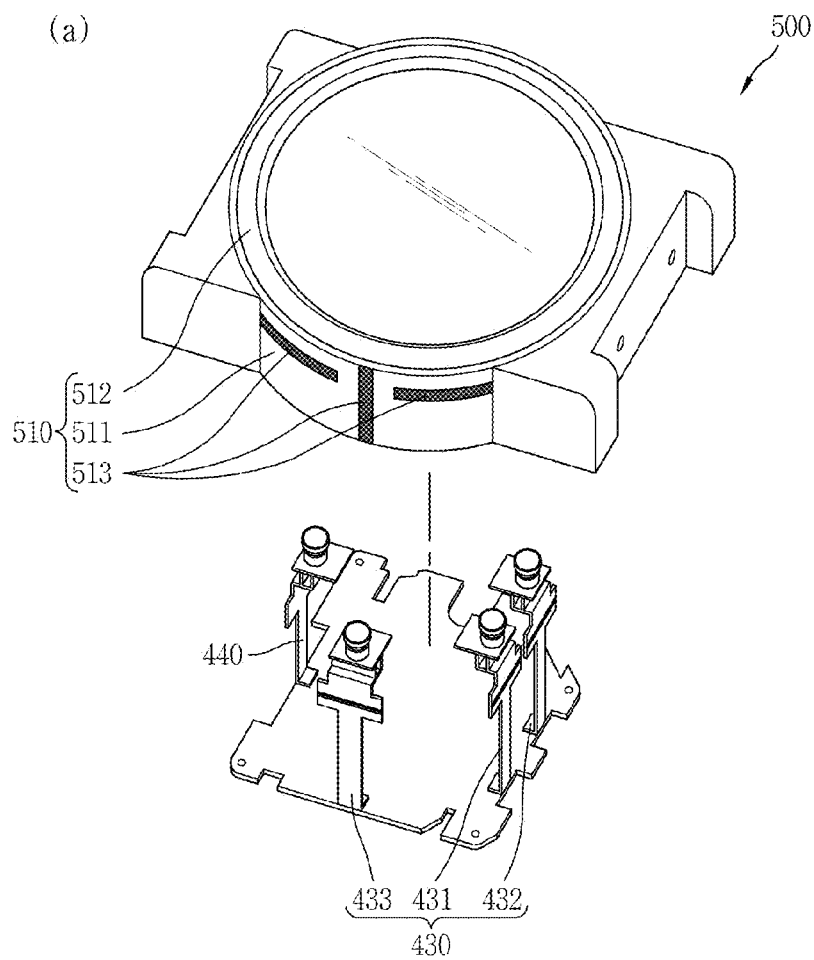
FIG. 5 illustrates a feeding structure and a body including a metal housing, a metal bezel, and a slot member in a watch-type mobile terminal according to an embodiment of the present invention.
Figure 5:
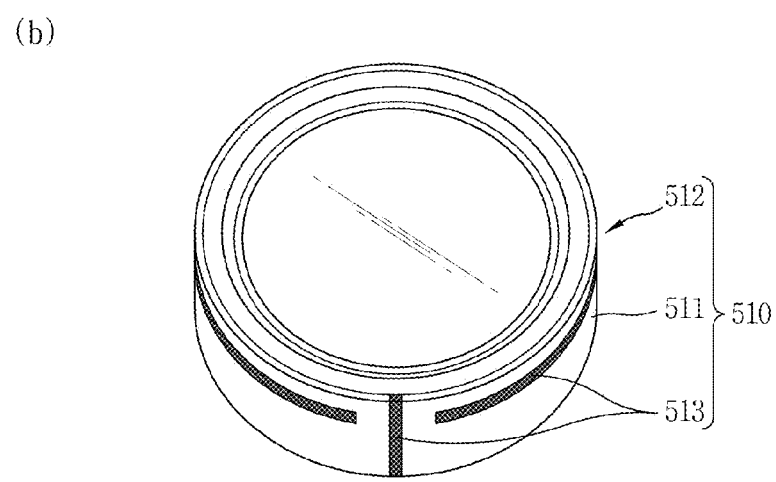

FIG. 5 illustrates a feeding structure and a body including a metal housing, a metal bezel, and a slot member in a watch-type mobile terminal 500 according to an embodiment of the present invention. In this context, unlike the antenna equipped in the body in FIGS. 3 and 4, each of the metal housing and the metal bezel of the body may operate an antenna in FIG. 5. When a user rotates the metal bezel, the metal bezel corresponding to a rotary body and a part corresponding to a fixing body may maintain a contact state therebetween. The contact state between the metal bezel (the rotary body) and the fixing body may be referred to as a moving bezel feeding contact.

FIG. 5 (*a*) is an exploded view of the feeding structure and the body including the metal housing, the metal bezel, and the slot member in the watch-type mobile terminal 500. On the other hand, FIG. 5 (*a*) is a side view of the body including the metal housing, the metal bezel, and the slot member in the watch-type mobile terminal 500.

Referring to FIG. 5 (*a*), the watch-type mobile terminal 500 may include a body 510, a plurality of feeding units 430, and a ground part 440.

Referring to FIG. 5 (*b*), the body 510 may configure an external appearance of the watch and may operate a loop antenna. Here, a supporting part (or deco) that supports a display unit of the watch may be equipped in the body 510. Therefore, a slot may be provided in the supporting part (or deco), and thus, a loop antenna including an inner loop and an outer loop may be provided.

The body 510 may include a metal housing 511, a metal bezel 512, and a slot member 513.

The metal housing 511 may correspond to the outer loop 420 of FIG. 4 and may be connected to the ground part 440.

The metal bezel 512 may correspond to the outer loop 410 of FIG. 4 and may be connected to the plurality of feeding units 430. The metal housing 511 and the metal bezel 512 may be connected to each other at one end thereof, and the one end may correspond to the connector 450 as illustrated in FIG. 4.

The slot member 513 may be disposed between the metal housing 511 and the metal bezel 512 and may electrically disconnect the metal housing 511 from the metal bezel 512.

The plurality of feeding units 430 may respectively apply a plurality of communication signals to the loop antenna. That is, the plurality of feeding units 430 may respectively apply the plurality of communication signals to the loop antenna, the metal housing 511, and the metal bezel 512. The plurality of feeding units 430, as described above with reference to FIGS. 3 and 4, may include a first feeding unit 431, a second feeding unit 432, and a third feeding unit 433. In this context, the above description may be applied to each of frequency bands.

Figure 6:
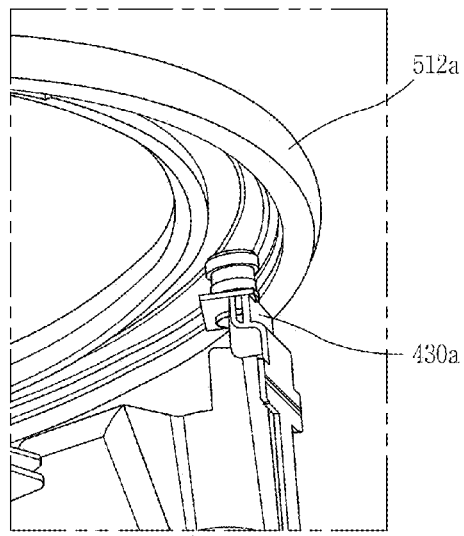
FIG. 6 illustrates a variable bezel feeding contact according to an embodiment of the present invention.
Figure 6:
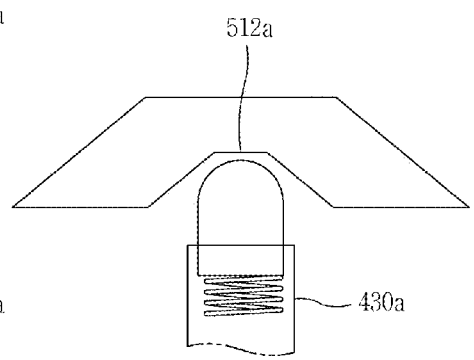
Figure 6:
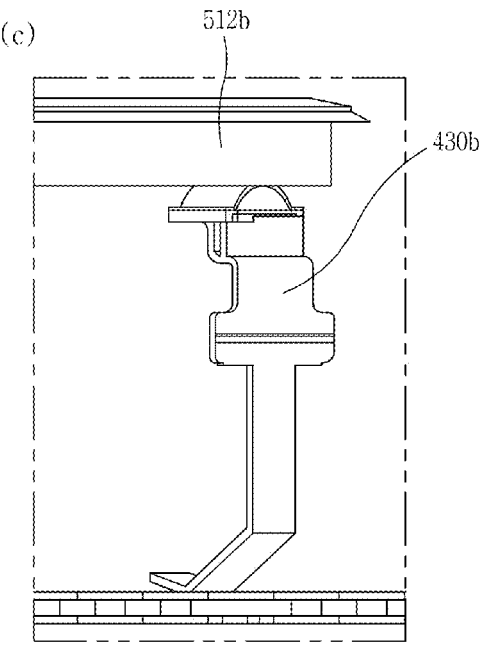
Figure 6:
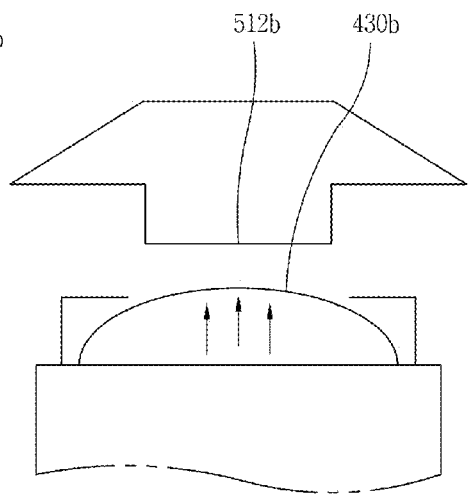

FIG. 6 illustrates a variable bezel feeding contact according to an embodiment of the present invention. In more detail, FIG. 6 (*a*) is a side view illustrating a guide rail type contact, and FIG. 6 (*b*) is a conceptual view illustrating a guide rail type contact. Also, FIG. 6 (*a*) is a side view illustrating a contact guide type contact, and FIG. 6 (*b*) is a conceptual view illustrating a contact guide type contact.

In this context, referring to FIGS. 6 (*a*) and (*b*), the metal bezel 512*a* may be configured in a guide rail type where a groove is provided in the metal bezel 512*a*. The plurality of feeding units 430*a* may each be implemented with a pin into which a spring is inserted. The pin may be accommodated into the groove of the metal bezel 512*a*, and when the metal bezel 512 rotates, the metal bezel 512*a* and the pin may be electrically connected to each other.

In this context, referring to FIGS. 6 (*c*) and (*d*), the metal bezel 512*b* may be configured in a contact guide type which protrudes to the outside. A plurality of feeding units 430*b* may each be implemented with an arch type spring. A contact structure between the metal bezel 512*b* and the plurality of feeding units 430*b* may be referred to as a bezel contact guide. When the spring contacts the contact guide of the metal bezel 512*b* and thus the metal bezel 512*b* rotates, the metal bezel 512*b* and the pin may be electrically connected to each other.

The ground part 440 may be connected to a ground of the watch in one of the metal housing 511 and the metal bezels 512*a* and 512*b*. The ground part 440 may include a switching element so that one of one of the metal housing 511 and the metal bezels 512*a* and 512*b* is electrically connected to or disconnected from the ground part 440. Resonance lengths which physically differ at different frequency bands may be provided at the first frequency band and the second frequency band by the switching element.

Figure 7:
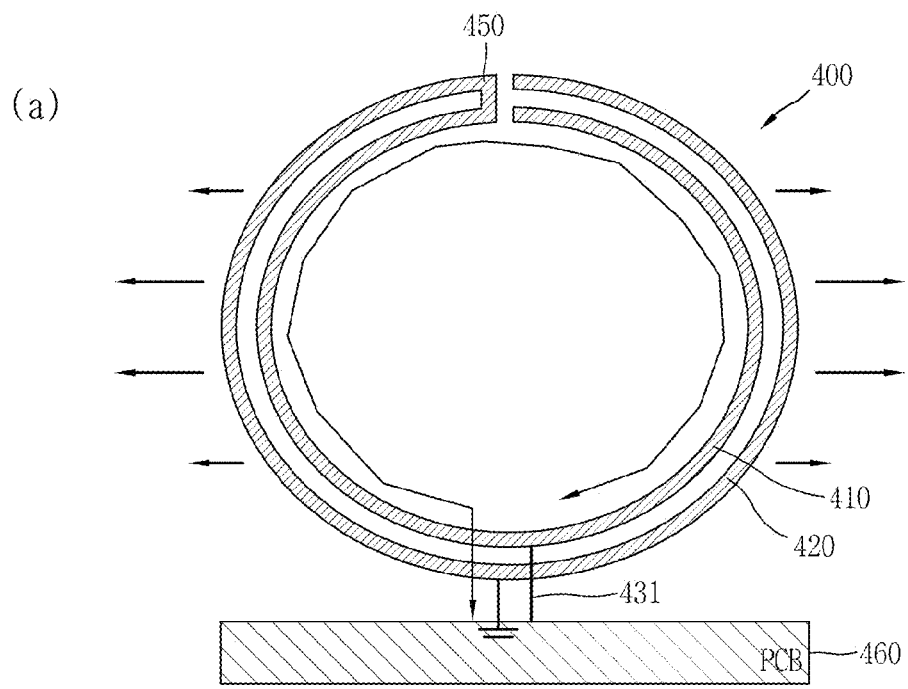
FIG. 7 illustrates the operation principle of an antenna at a first frequency band and a second frequency band based on feeding in a first feeding unit according to an embodiment of the present invention.
Figure 7:
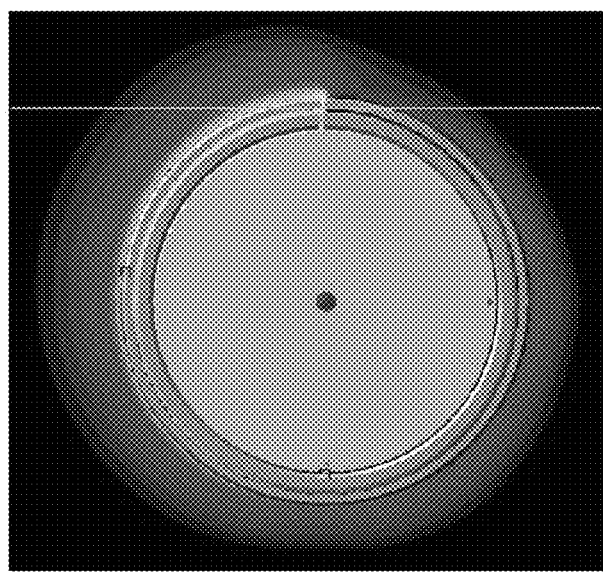
Figure 8:
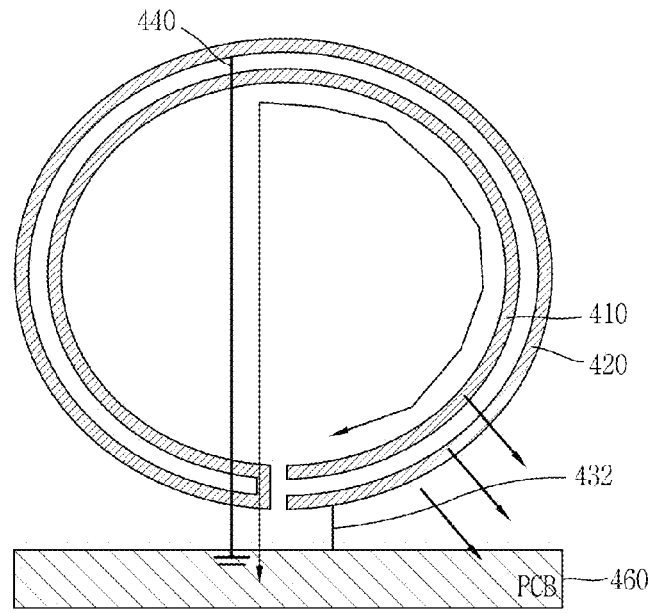
FIG. 8 illustrates the operation principle of an antenna at a third frequency band and a fourth frequency band based on feeding in a second feeding unit according to an embodiment of the present invention.
Figure 8:
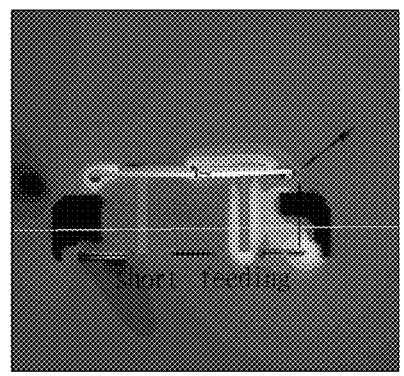
Figure 8:
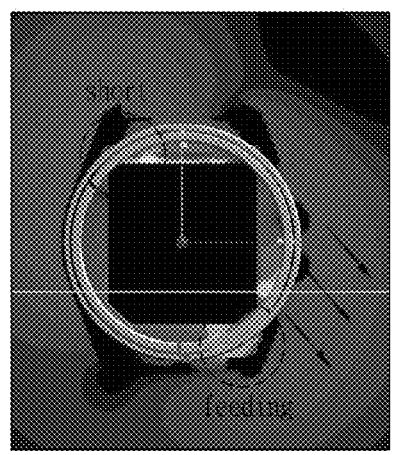
Figure 9:
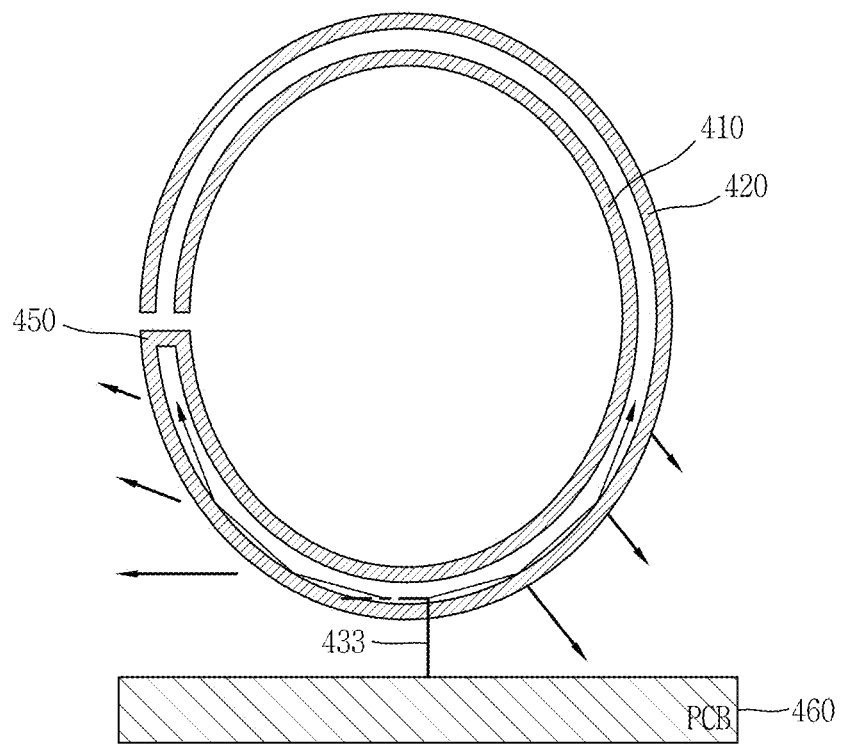
FIG. 9 illustrates the operation principle of an antenna at a fifth frequency band based on feeding in a third feeding unit according to an embodiment of the present invention.
Figure 9:
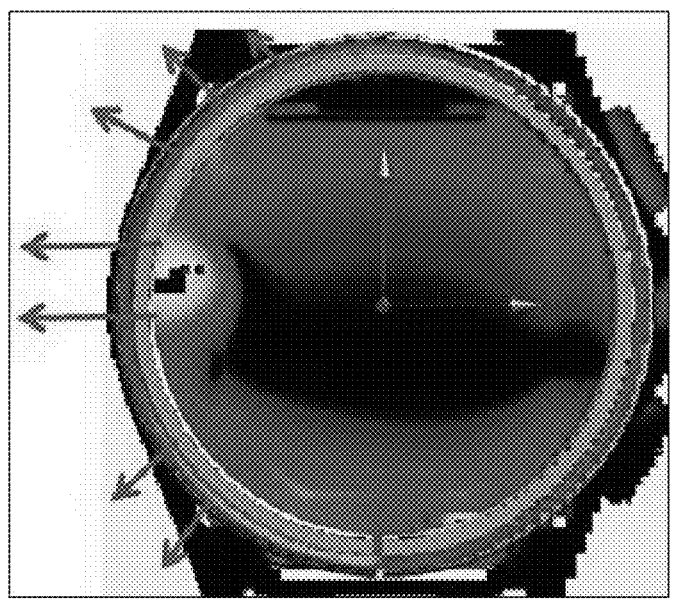

FIGS. 7 to 9 illustrate the operation principle of an antenna based on feeding in first to third feeding units according to an embodiment of the present invention.

FIG. 7 illustrates the operation principle of an antenna 400 at the first frequency band and the second frequency band based on feeding in the first feeding unit according to an embodiment of the present invention.

In this context, the second frequency band may be a frequency band which is higher than the first frequency band. For example, the antenna 400 may provide a mobile communication service such as WCDMA, LTE, and/or the like at the first frequency band and the second frequency band. According to an embodiment, the first frequency band may be an LTE frequency band, and the second frequency band may be an additional frequency band for carrier aggregation in LTE-A. The first frequency band and the second frequency band are not limited to the LTE frequency band and the LTE-A frequency band and may be partially changed for providing the mobile communication service such as WCDMA, LTE, and/or the like. In this case, a length of a circumference of the antenna 400 may be set to a half wave length at the first frequency band and may be set to one wave length at the second frequency band. That is, the antenna 400 may operate as a loop antenna which has a half wave length at the first frequency band and has one wave length at the second frequency band.

Referring to FIG. 7 (a), an inner loop 410 may be connected to a signal line of a PCB 460 through a first feeding unit 431, and an outer loop 420 may be connected to a ground of the PCB 460 through a ground part 440. In this case, the inner loop 410 and the outer loop 420 may be a loop mode including two rings, and radiation by an electric field may be performed through the outside of a loop. In other embodiments, the inner loop 410 may be connected to the ground of the PCB 460 through the first feeding unit 431, and the outer loop 420 may be connected to the signal line of the PCB 460 through the ground part 440.

Referring to FIG. 7 (b), it can be seen that an intensity of an electric field is the maximum (red) in a space between the inner loop 410 and the outer loop 420, but as a distance between the inner loop 410 and the outer loop 420 increases, the intensity of the electric field is reduced (blue).

FIG. 8 illustrates the operation principle of an antenna at the third frequency band and the fourth frequency band based on feeding in a second feeding unit 432 according to an embodiment of the present invention.

In this context, the fourth frequency band may be a frequency band which is higher than the third frequency band. For example, the antenna may provide a Wi-Fi service or a Bluetooth service at the third frequency band and the fourth frequency band. In this context, the third frequency band may be a frequency band for providing a first Wi-Fi service and the Bluetooth service. Also, the fourth frequency band may be a frequency band for providing a second Wi-Fi service. For example, the first Wi-Fi service may support 802.11b, 802.11g, 802.11n, and 802.11ad standards. Also, the second Wi-Fi service may support 802.11a, 802.11n, and 802.11ad standards. That is, a Wi-Fi service associated with 802.11n and 802.11ad standards may be provided at both the third frequency band and the fourth frequency band.

The third frequency band and the fourth frequency band are not limited to the above-described frequency bands for services and may include a frequency band based on interface standard and a communication service at an industrial science medical (ISM) frequency band such as Wi-Fi, Bluetooth, Zigbee, etc. In this case, a length from the second feeding unit 432 to a ground part 440 may be set to a half wave length at the third frequency band and may be set to one wave length at the fourth frequency band. That is, the antenna may operate as a folded antenna which has a half wave length at the third frequency band and has one wave length at the fourth frequency band.

Referring to FIG. 8 (a), an inner loop 410 may be connected to a signal line of a PCB 460 through the second feeding unit 432, and an outer loop 420 may be connected to a ground of the PCB 460 through the ground part 440. In other embodiments, the inner loop 410 may be connected to the ground of the PCB 460 through the second feeding unit 432, and the outer loop 420 may be connected to the signal line of the PCB 460 through the ground part 440.

Referring to FIG. 8 (b), radiation of a loop mode having a length corresponding to a ¼ wave length and a half wave length of a resonant mode may be performed between the second feeding unit 432 and the ground part 440. In this case, as illustrated in FIGS. 8 (b) and (c), it can be seen that an intensity of an electric field is the maximum (red) in a space between the second feeding unit 432 and the ground part 440. On the other hand, it can be seen that as a distance between the second feeding unit 432 and the ground part 440 increases, the intensity of the electric field is reduced (blue).

FIG. 9 illustrates the operation principle of an antenna at the fifth frequency band based on feeding in a third feeding unit 433 according to an embodiment of the present invention.

In this context, the fifth frequency band may include a frequency band that supports a GPS L1/L2 service and a global navigation satellite system (GLONASS) service. The fifth frequency band is not limited to the frequency band for the GPS L1/L2 service and the GLONASS service and may be partially changed for providing a necessary GPS service. In this case, the third feeding unit 433 may correspond to a ¼ point of a length of a circumference of the loop antenna from the one end. The third feeding unit 433 may be slot-fed to a space between the inner loop 410 and the outer loop 420.

Referring to FIG. 9 (a), an electric field may be coupled to a slot, corresponding to a space between the inner loop 410 and the outer loop 420, by the third feeding unit 433. In this case, the electric field coupled to the slot may correspond to a center of the slot and may be the maximum electric field. In the electric field, electric fields may be generated in both sides of the slot corresponding to a half wave length.

As illustrated in FIG. 9 (a), an electric field from a signal line of a PCB 460 may be coupled through the space between the inner loop 410 and the outer loop 420.

As illustrated in FIG. 9 (b), if the antenna 400 is equipped in the watch-type mobile terminal 300, it can be seen that an intensity of an electric field is the maximum in the space between the inner loop 410 and the outer loop 420, and as a distance between the inner loop 410 and the outer loop 420 increases, the intensity of the electric field is reduced. As illustrated in FIGS. 9 (a) and (b), it can be seen that electric fields are mainly distributed in only an area corresponding to a half of the inner loop 410 and the outer loop 420, and thus, only the area corresponding to the half operates as an antenna. The inner loop 410 and the outer loop 420 in FIGS. 7 to 9 may be replaced with the metal bezel 512 and the metal housing 511 in FIGS. 5 and 6.

In a case where the antenna 400 described above with reference to FIGS. 3 to 9 is accommodated into the watch-type mobile terminal 300 and operates, a change in a radiation pattern of the antenna 400 based on whether the watch is worn will be described below.

Figure 10:
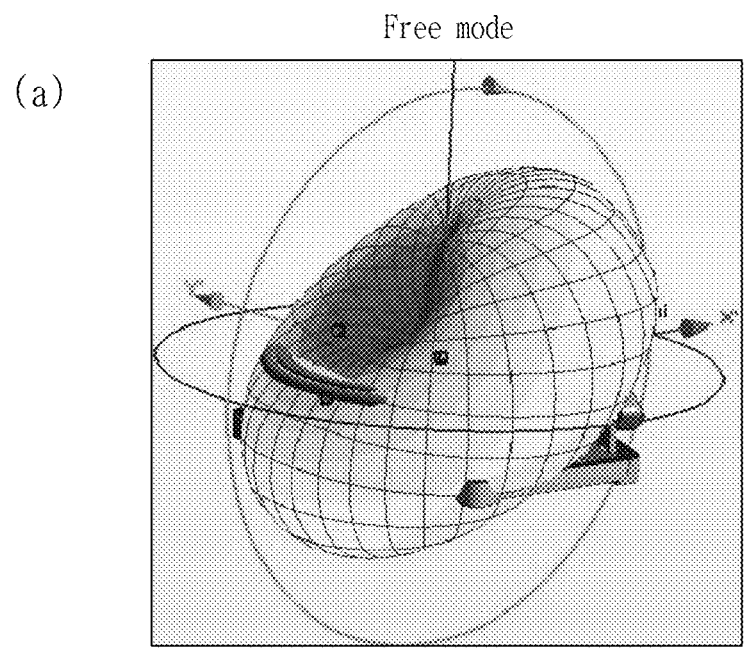
FIG. 10 illustrates a change in a radiation pattern of an antenna accommodated into a watch according to an embodiment of the present invention, based on whether the watch is worn.
Figure 10:
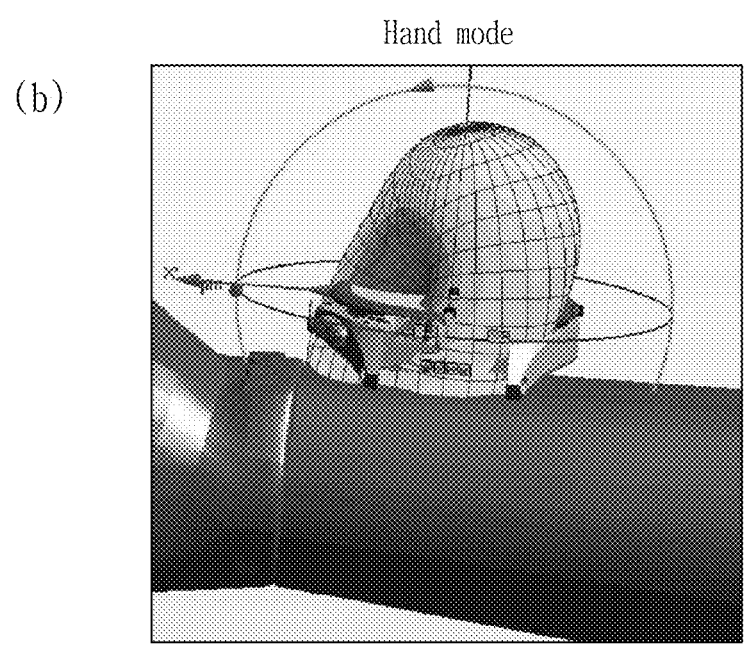

In this context, FIG. 10 illustrates a change in a radiation pattern of an antenna accommodated into a watch according to an embodiment of the present invention, based on whether the watch is worn.

Referring to FIG. 10 (a), FIG. 10 (a) corresponds to a case where a user does not wear the watch, and the case may be referred to as a free mode. In the free mode, it can be seen that a maximum value of a radiation pattern by the antenna 400 is toward an upper end of a center of the watch-type mobile terminal 300.

Referring to FIG. 10 (b), FIG. 10 (b) corresponds to a case where the user wears the watch, and the case may be referred to as a hand mode. In the hand mode, the maximum value of the radiation pattern by the antenna 400 is toward the upper end of the center of the watch-type mobile terminal 300, and thus, it can be seen that there is no change in the radiation pattern in the free mode. That is, a radiation pattern difference between the free mode and the hand mode corresponds to an effect where the user wears the watch, and as the watch contacts a human body having a high permittivity, an electric field near a contacted area is reduced.

Therefore, it can be seen that in a body-type antenna accommodated into a watch, a change in a radiation pattern based on whether the watch is worn is smaller than a band-type antenna accommodated into a band of the watch.

Figure 11:
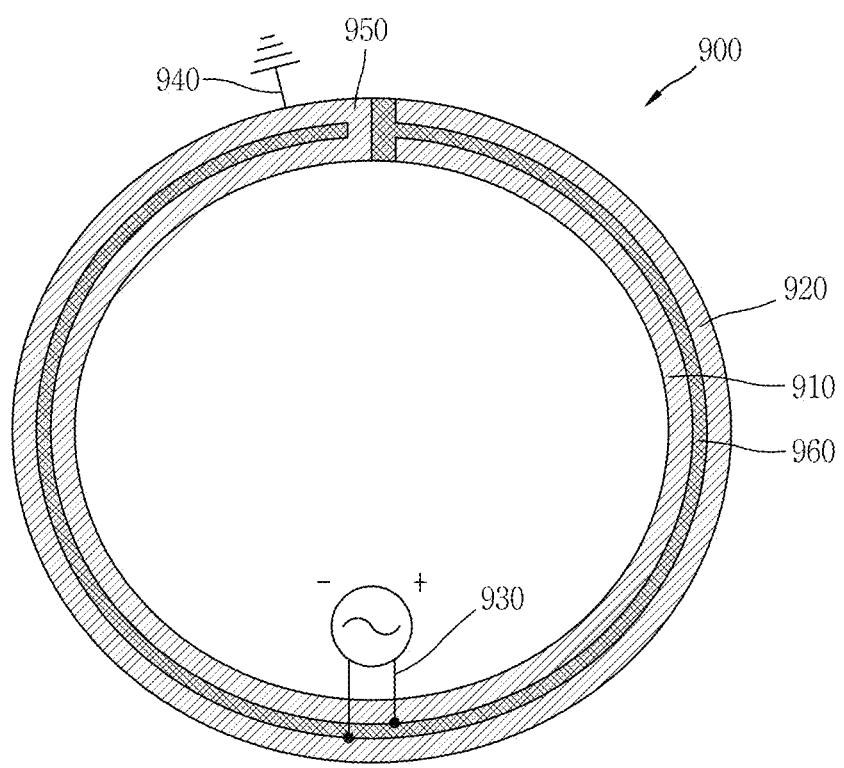
FIG. 11 illustrates an embodiment of a loop antenna capable of being equipped in a watch according to an embodiment of the present invention. A plurality of communication services may be simultaneously provided through one antenna.

FIG. 11 illustrates an embodiment of a loop antenna 900 capable of being equipped in a watch according to an embodiment of the present invention. A plurality of communication services may be simultaneously provided through one antenna.

As illustrated in FIG. 11, in the loop antenna 900, a slot 960 may be provided in a circular ring antenna 900. The circular ring antenna 900 may be divided into an inner loop 910 and an outer loop 920 by the slot 960. In this case, each of the inner loop 910 and the outer loop 920 may be connected to a feeding unit 930 and a ground part 940. As described above, since the circular ring antenna 900 is capable of being equipped in the watch, the antenna 900 may be manufactured as a substrate type PCB or a flexible PCB and may be easily accommodated into the watch.

Effects of the watch-type mobile terminal including an antenna according to the embodiments of the present invention will be described below.

According to at least one of the embodiments of the present invention, one antenna may include a plurality of feeding units, and thus, a plurality of communication services may be provided through the one antenna.

Moreover, according to at least one of the embodiments of the present invention, by simultaneously applying a signal to the plurality of feeding units, the plurality of communication services may be simultaneously provided through the one antenna.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A watch-type mobile terminal comprising:
   a body configured to function as a loop antenna having an inner loop and an outer loop;
   a display positioned relative to the body;
   wireless communication unit coupled to the body for performing wireless communications;
   a controller operatively coupled to the display and wireless communication unit to permit controlling of the display and the wireless communication unit;
   a plurality of feeding units providing a plurality of communication signals to the loop antenna, wherein the plurality of feeding units comprise a first feeding unit and a second feeding unit; and
   a ground part connected to a ground of the watch-type mobile terminal,
   wherein the body comprises:
   a metal housing electrically connected to the ground part, the metal housing forming the outer loop;
   a metal bezel electrically connected to the plurality of feeding units, the metal bezel forming the inner loop; and
   a slot member disposed between the metal housing and the metal bezel to electrically disconnect the metal housing from the metal bezel, and
   wherein the first feeding unit and the ground part are connected to the inner loop and the outer loop, respectively and the second feeding unit and the ground part are connected to the inner loop and the outer loop, respectively.

2. The watch-type mobile terminal of claim 1, wherein the plurality of feeding units further comprise: a third feeding unit; wherein
   the first feeding unit provides a communication signal, among the plurality of communication signals, at a first frequency band and at a second frequency band for a mobile communication service;
   the second feeding unit applies a communication signal, among the plurality of communication signals, at a third frequency band and at a fourth frequency band for a Wi-Fi or Bluetooth communication service; and
   the third feeding unit applies a radio frequency (RF) signal, among the plurality of communication signals, at a fifth frequency band for a global positioning system (GPS) service.

3. The watch-type mobile terminal of claim 2,
   wherein the third feeding unit is slot-fed to a space between the inner loop and the outer loop.

4. The watch-type mobile terminal of claim 2, wherein the second frequency band is a frequency band which is higher than the first frequency band, and
   wherein a length of a circumference of the loop antenna is set to a half wavelength at the first frequency band and is set to one wavelength at the second frequency band.

5. The watch-type mobile terminal of claim 2, wherein the fourth frequency band is a frequency band which is higher than the third frequency band, and
   wherein a length from the second feeding unit to the ground part is set to a half wavelength at the third frequency band and is set to one wavelength at the fourth frequency band.

6. The watch-type mobile terminal of claim 2, wherein the third feeding unit corresponds to a ¼ point of a length of a circumference of the loop antenna.

7. The watch-type mobile terminal of claim 2, wherein the first feeding unit, the second feeding unit, and the third feeding unit are vertically coupled to the loop antenna.

8. The watch-type mobile terminal of claim 1, wherein one end of each of the inner loop and the outer loop is close to another end of each of the inner loop and the outer loop so that a radio frequency (RF) signal at the one end of each of the inner loop and the other loop is coupled to a respective one of the another end of the inner loop and the outer loop, and
wherein the another end of each of the inner loop and the outer loop is open.

9. The watch-type mobile terminal of claim 1, wherein the metal housing and the metal bezel are connected to each other at one end.

10. The watch-type mobile terminal of claim 1, wherein the plurality of feeding units each comprise a pin into which a spring is inserted,
wherein the pin, for each of the plurality of feeding units, is accommodated in a groove of the metal bezel, and
wherein the metal bezel and the pin are electrically connected to each other when the metal bezel rotates.

11. The watch-type mobile terminal of claim 1, wherein the plurality of feeding units each comprise an arch-type spring, and
wherein when the spring, for each of the plurality of feeding units, contacts a contact guide of the metal bezel and the metal bezel rotates, the metal bezel and the pin are electrically connected to each other.

12. An antenna, comprising:
an inner loop having an open end;
an outer loop spaced apart from the inner loop by a separation distance;
a connector connected to one end of each of the inner loop and the outer loop;
a plurality of feeding units providing a plurality of communication signals to one of the inner loop and the outer loop, wherein the plurality of feeding units comprise a first feeding unit and a second feeding unit; and
a ground part connected to a ground of a watch in one of the inner loop or the outer loop,
wherein the inner loop and the outer loop are accommodated in a body for a watch-type mobile terminal, and
wherein the first feeding unit and the ground part are connected to the inner loop and the outer loop, respectively and the second feeding unit and the ground part are connected to the inner loop and the outer loop, respectively.

13. The antenna of claim 12, wherein the plurality of feeding units further comprise: a third feeding unit; wherein
the first feeding unit provides a communication signal, among the plurality of communication signals, at a first frequency band and at a second frequency band for a mobile communication service;
the second feeding unit applies a communication signal, among the plurality of communication signals, at a third frequency band and at a fourth frequency band for a Wi-Fi or Bluetooth communication service; and
the third feeding unit applies a radio frequency (RF) signal, among the plurality of communication signals, at a fifth frequency band for a global positioning system (GPS) service.

14. The antenna of claim 13, wherein the third feeding unit is slot-fed to a space between the inner loop and the outer loop.

15. The antenna of claim 13, wherein the second frequency band is a frequency band which is higher than the first frequency band, and
wherein a length of a circumference of the loop antenna is set to a half wavelength at the first frequency band and is set to one wavelength at the second frequency band.

16. The antenna of claim 13, wherein the fourth frequency band is a frequency band which is higher than the third frequency band, and
wherein a length from the second feeding unit to the ground part is set to a half wavelength at the third frequency band and is set to one wavelength at the fourth frequency band.

17. The antenna of claim 13, wherein the third feeding unit corresponds to a ¼ point of a length of a circumference of the loop antenna.

18. The antenna of claim 12, wherein one end of each of the inner loop and the outer loop is close to another end of each of the inner loop and the outer loop so that a radio frequency (RF) signal at the one end of each of the inner loop and the other loop is coupled to a respective one of the another end of the inner loop and the outer loop, and
wherein the another end of each of the inner loop and the outer loop is open.

* * * * *